United States Patent [19]
Akiyama et al.

[11] Patent Number: 5,832,210
[45] Date of Patent: Nov. 3, 1998

[54] DEVICE AND METHOD FOR CONTROLLING COMMUNICATION

[75] Inventors: Ryota Akiyama, Kawasaki; Yoshikazu Tsuji, Iwaki, both of Japan

[73] Assignee: Fujitsu Limited, Kawasaki-ku, Japan

[21] Appl. No.: 504,079

[22] Filed: Jul. 19, 1995

[30] Foreign Application Priority Data

Nov. 21, 1994 [JP] Japan ................................. 6-286881

[51] Int. Cl.⁶ ........................... G06F 12/14; G11B 23/28; H04K 1/00
[52] U.S. Cl. ........................ 395/188.01; 380/3; 380/23; 380/44
[58] Field of Search .................. 371/67.1, 68.2, 371/69.1, 5.1, 5.3, 5.5, 30, 32, 33, 20.1; 395/182.16, 183.19, 183.16, 184.01, 185.01, 186, 187.01, 188.01, 491, 188; 364/265, 265.1, 266.4, 944.5, 943.9; 380/2, 3, 21, 23, 24, 25, 36, 37, 42, 43, 44; 340/825.31, 825.34

[56] References Cited

U.S. PATENT DOCUMENTS

| | | | |
|---|---|---|---|
| 4,955,049 | 9/1990 | Ghisler | 455/410 |
| 5,317,636 | 5/1994 | Vizcaino | 380/23 |
| 5,450,491 | 9/1995 | McNair | 380/25 |
| 5,506,905 | 4/1996 | Markawski et al. | 380/25 |
| 5,557,676 | 9/1996 | Naslund et al. | 380/23 |

*Primary Examiner*—Trinh L. Tu
*Attorney, Agent, or Firm*—Armstrong, Westerman, Hattori, McLeland & Naughton

[57] ABSTRACT

A transmission unit transmits the identical transmitting information including a communication number information. A communication number counting unit increments the communication number information every time the identical transmitting information is transmitted, sets the communication number information which is greater than the incremented last communication number information to an initial communication number information when a renewed transmitting information is transmitted, and increments the initial communication number every time the renewed transmitting information is transmitted. An information discrimination unit discriminates whether or not a receiving transmission information conforms with a registration transmitting information. A communication number information comparison unit compares a receiving communication number information with a registration communication number information. A control unit adds a predetermined value to the receiving communication number information when the receiving transmission information conforms with the registration transmitting information and the received communication number information is greater than the registration communication number information.

22 Claims, 12 Drawing Sheets

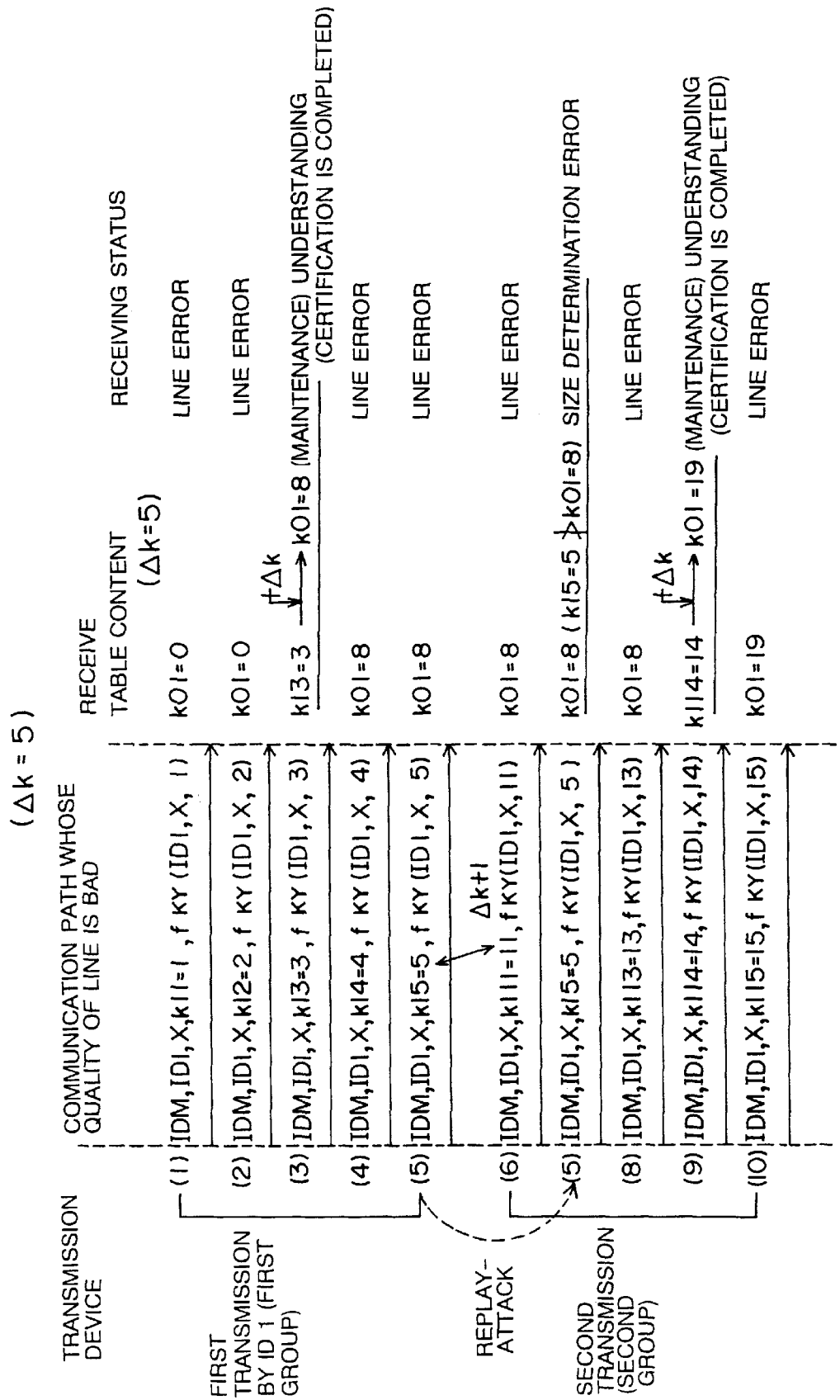

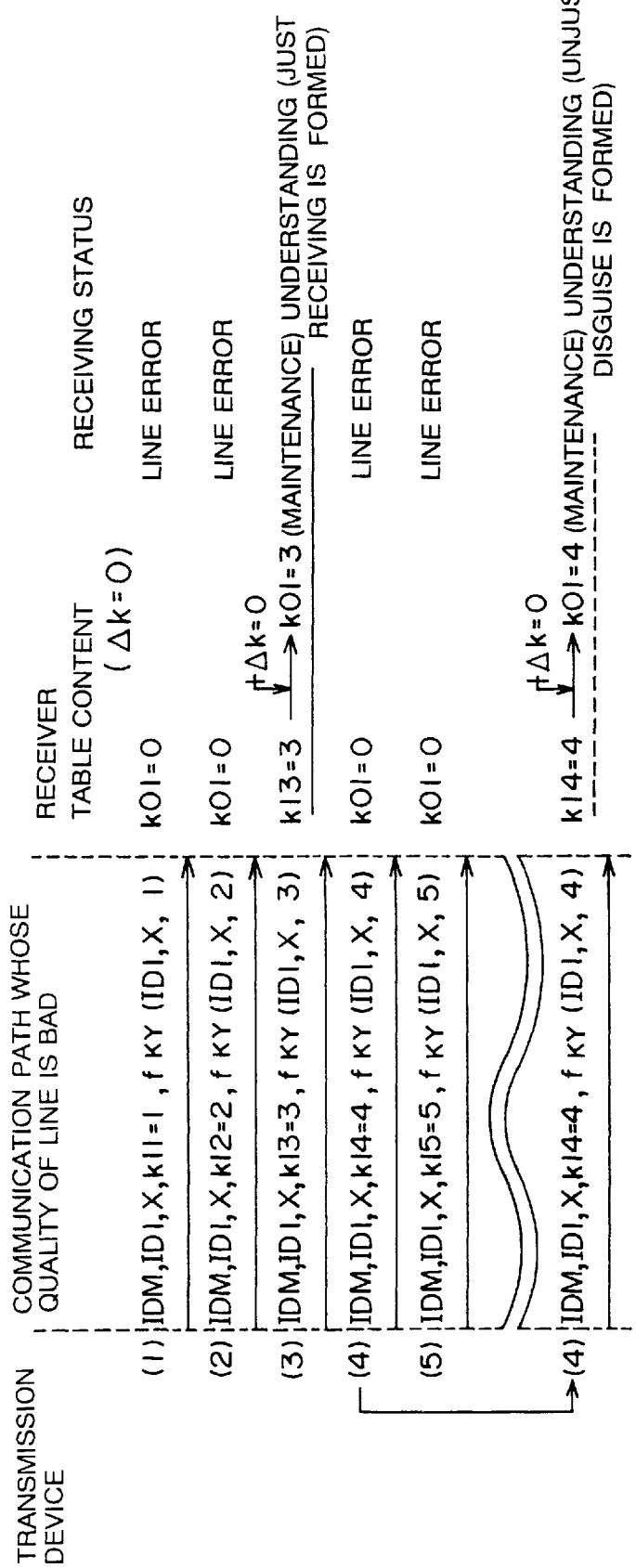

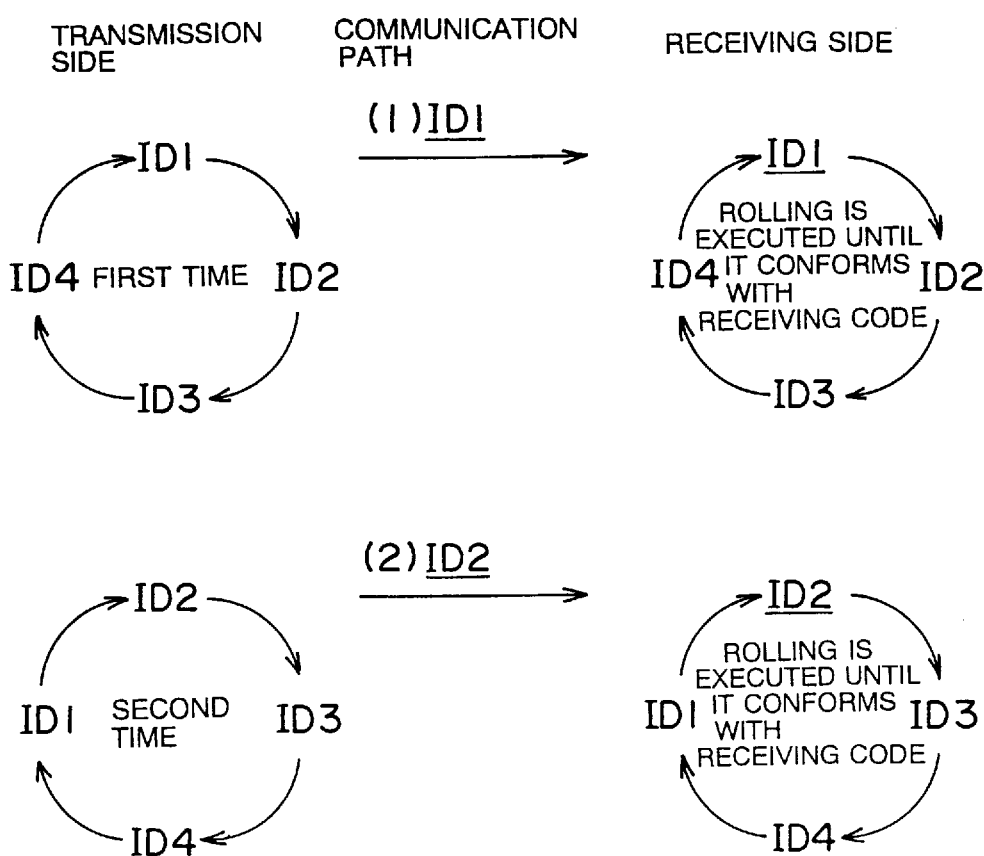

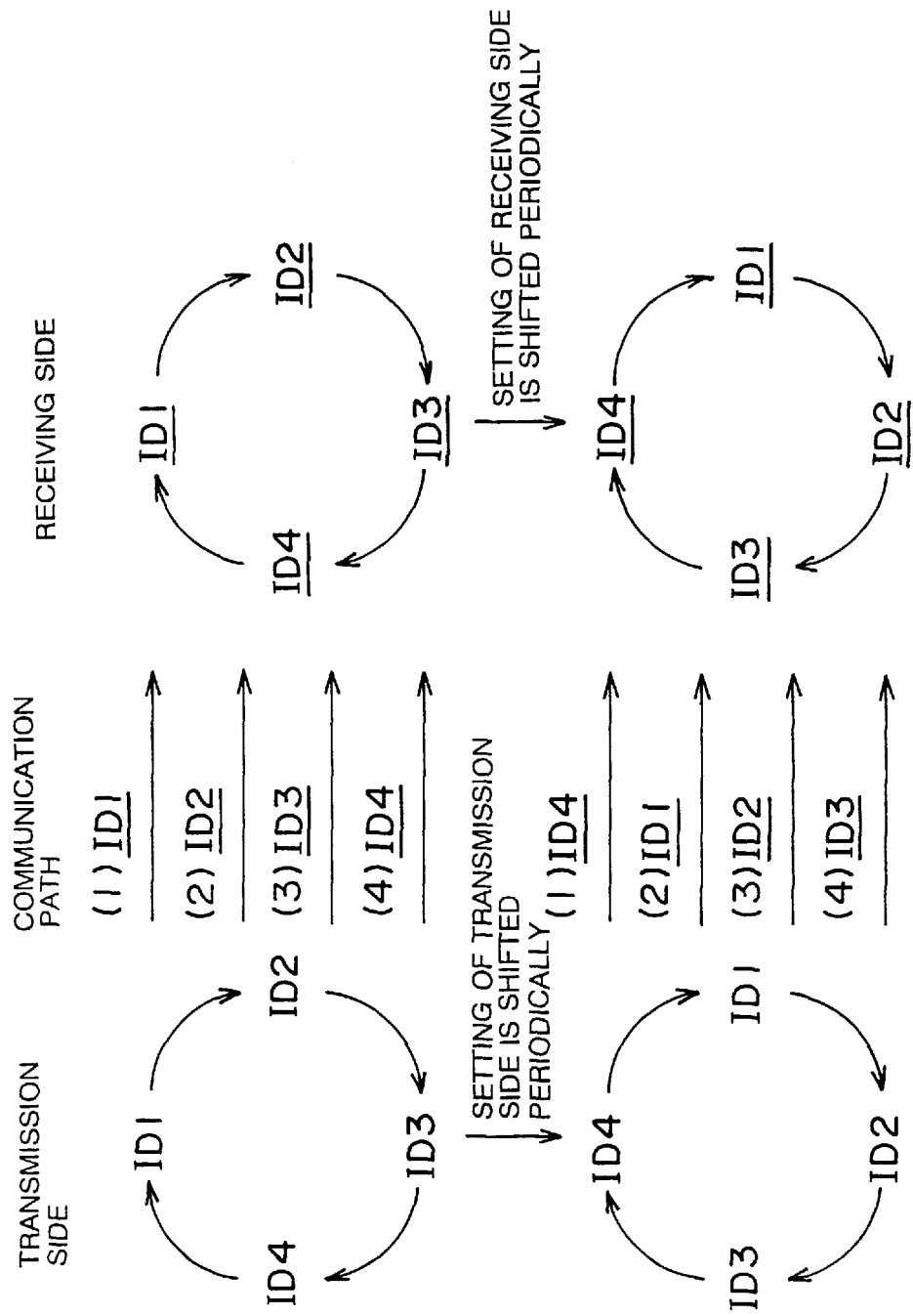

DEVICE AND METHOD FOR CONTROLLING COMMUNICATION

BACKGROUND OF THE INVENTION

1. Field of the Invention

The present invention relates to a device and a method for controlling communication which transmits a control information for controlling a receiving device safely and securely in one directional radio communication path whose line quality is poor from a transmission device to the receiving device.

2. Description of the Related Art

In recent years, the receiving device has been executing a certification for certifying a propriety of the transmission device by discriminating whether or not the transmission device is a proper transmission device, when the transmission device demands a radio communication to the receiving device.

In this case, the transmission device and the receiving device are provided with an identification code generator consisting of identical constructions. The receiving device will certify the transmission device as a proper transmission device if a transferred identification code conforms with the identification code which exists inside, when the transmission device transfers a proper Identification (ID) code to the receiving device. For instance, a serial partial matching method shown in FIG. 11 and a total serial matching method shown in FIG. 12 exist as the above-mentioned certification method.

In the serial partial matching method shown in FIG. 11, for instance, the identification code generator of the transmission device transmits an ID code serial having one cycle to the receiving device per ID code unit intermittently. On the other hand, the receiving device delimits the ID code serial per ID code unit in the same way as the transmission device, and makes a series of code serial units roll periodically.

For instance, the transmission device transmits an identification code ID 1 to the receiving device for the first time, and the receiving device makes the series of code serial units roll from the identification code ID 1 to an identification code ID 4. Besides, the transmission device transmits an identification code ID 2 which is different from the identification code ID 1 for the second time, and the receiving device makes the series of code serial units roll from the identification code ID 2 to the identification code ID 1.

Then, the receiving device determines whether or not the received identification code conforms with the identification code which was generated in the receiving side. The receiving device can determine the justice of the transmission device, if the identification codes are conformed with one another. By these actions, the receiving device takes in a transmission command which is transmitted after the identification code.

Further, in the receiving side, the identification code which was matched once is excluded from the matching objects. All of the ID code serials are set to the matching objects for the second time, when the matching object identification code is void.

On the other hand, in the total serial matching method shown in FIG. 12, for instance, the identification code generator transmits the ID code to the receiving device in the same way as the serial partial matching method. The receiving device is prepared for the ID code serials ID 1–ID 4 beforehand in the same ID code serials ID 1–ID 4 as the ID code serials ID 1–ID 4 of the transmission side, after the transmission device transmits all of the ID code serials ID 1–ID 4 to the receiving device. The receiving device certifies that the transmission device is just, when the ID code serials are synchronized between the transmission device and the receiving device. By these actions, the receiving device receives a transmission command which is transmitted after the ID code serial to execute a process.

Besides, for instance, the transmission device changes the identification code ID 1 into the identification code ID 4 by shifting the setting of the ID code serials, when the receiving device executes the next certification. Namely, the transmission device transmits the ID code serial to the receiving device as though the different kinds of ID code serials had been generated. Each of these two certification methods changes the identification code between transmission and reception.

However, in the conventional method, the receiving device could not receive the identification code transmitted from the transmission device correctly, since the line quality was bad in a communication path. For this reason, the receiving device could not change the identification code.

Besides, in the above-mentioned state, a third person can wiretap the communication contents including the identification code improperly around the transmission device. The third person can execute a retransmission of the identification code, namely, a replay attack in the disguise of a proper transmitter. For this reason, the two conventional certification methods were not resistant to the replay attack. The transmission device and the receiving device are provided with a code circuit for coding an identification information in a complicated manner so as to resist the replay attack. However, the transmission device and the receiving device become complicated.

Further, it took a lot of time until the transmission code conformed with the receiving code, when the cycle of the code serial was set up long enough to improve the safety. For this reason, the processing speed was deteriorated.

Besides, a plurality of users can control one receiving device held in common by a plurality of transmission devices. In this case, the plurality of transmission devices are provided with the identical code generators. For instance, there was the possibility that the third person would misuse the receiving device held in common by the lost transmission device, when one of the plurality of transmission devices was lost.

SUMMARY OF THE INVENTION

An object of the present invention is to provide a device and a method for controlling communication which prevent a reuse of an identification code by a third person, even if the identification code was stolen by the third person, and can execute a process at a high speed.

The device for controlling communication comprises a transmission device and a receiving device. The transmission device comprises a transmission unit and a communication number counting unit. The receiving unit comprises an information discrimination unit, a communication number information comparison unit and a control unit.

The transmission unit transmits an identical transmitting information including a communication number information indicating a transmission number a plurality of times repeatedly. The communication number counting unit increments the communication number information within the transmission unit every time the identical transmitting information is transmitted, sets the communication number information which is larger than the incremented last communication number information to an initial communication number information when a renewed transmitting information is transmitted, and increments the initial communication number information every time the renewed transmitting information is transmitted.

The information determination unit determines whether or not the transmitting information other than the communication number information of the transmitting information received from the transmission device conforms with a registration transmitting information which was registered previously. The communication number information comparison unit compares the received communication number information with the communication number information which was registered previously. The control unit adds a predetermined value to the received communication number information, when the received transmitting information conforms with a registration transmitting information and the received communication number information is larger than the registered communication number information.

The device for controlling communication of the present invention can also be constructed concretely as follows. The transmitting information can be composed of a destination information indicating a transmitting identification information and a receiving identification information, a control information for controlling the receiving device and a certifier indicating a justice of the communication number information and the transmission device. The transmission device can be provided with a unidirectional function circuit which generates the certifier by inputting the destination information, the control information, the communication number information and a certifying key into the unidirectional function.

The communication number counting unit may decrement the communication number information within the transmission unit every time the identical transmission information is transmitted, set the communication number information which is smaller than the decremented last communication number information to an initial communication number information, when a renewed transmitting information is transmitted and decrement the initial communication number information every time the renewed transmitting information is transmitted.

The control unit may subtract the predetermined value from the received communication number information when the received transmitting information conforms with the registration transmitting information and the received communication number information is smaller than the registered communication number information.

The communication number counting unit may set the communication number information in which 1 was added to a plurality of times of the last communication number information to the initial communication number information, when the renewed transmitting information is transmitted, and increment the initial communication number information every time the renewed transmitting information is transmitted. The receiving device can be provided with a command analysis unit for analyzing the received destination information when the received destination information conforms with the destination information which was registered previously.

The receiving device can be provided with a storage unit, a unidirectional function circuit and a certifier discrimination unit. The storage unit stores the same certifying key as the certifying key which is inputted into the unidirectional function circuit within the transmission device regarding the transmitting identification information as an address. The unidirectional function circuit generates a certifier by inputting the destination information received from the transmission device, the control information, the communication number information and the certifying key stored in the storage unit into the unidirectional function. The certifier discrimination unit determines whether or not the certifier received from the transmission device conforms with the certifier obtained in the unidirectional function circuit.

The control unit adds the predetermined value to the received communication number information and stores the obtained communication number information in the storage unit when the certifier generated in the unidirectional function circuit within the transmission device conforms with the certifier generated in the unidirectional function circuit within the receiving device. The predetermined value to be added to the received communication number information can be the same value as the number of times of transmissions of the identical transmitting information.

The transmission device further transmits the transmitting information repeatedly when the certifier generated in the unidirectional function circuit within the transmission device does not conform with the certifier generated in the unidirectional function circuit within the receiving device. The receiving device can receive the transmitting information and execute the process repeatedly until the certifiers are conformed with one another.

The transmission device can be provided with a storage unit, a unidirectional function circuit, a combining unit and a communication number counting unit. The storage unit stores a destination information indicating a transmitting identification information and a receiving identification information, a control information and a communication number information indicating a transmission number. The unidirectional function circuit generates a certifier by inputting each information stored in the storage unit and a certifying key into a unidirectional function. The combining unit combines the certifier with each information stored in the storage unit, and transmits the obtained identical transmitting information a plurality of times repeatedly. The communication number counting unit increments the communication number information within the combining unit every time the identical transmitting information is transmitted, sets the communication number which is larger than the incremented last communication number information to an initial communication number information when a renewed transmitting information is transmitted, and increments the initial communication number information every time the renewed transmitting information is transmitted.

Further, the receiving device can be provided with an information discrimination unit, a communication number information comparison unit and a control unit. The information discrimination unit discriminates whether or not the transmitting information other than the communication number information indicating a transmission number of the transmitting informations received from the transmission device conforms with a registration transmitting information which was registered previously. The communication number information comparison unit compares the received communication number information with the communication number information which was registered previously. The control unit adds a predetermined value to the received communication number information, when the transmitting information conforms with the registration transmitting information and the received communication number information is larger than the registered communication number information.

The method for controlling communication of the present invention comprises a transmission step and a receiving step. The transmission step is composed of an information transmitting step and a communication number counting step. The information transmitting step transmits the identical transmitting information including a communication number information indicating a transmission number a plurality of times repeatedly. The communication number counting step increments the communication number information every time the identical transmitting information is transmitted, sets the communication number information which is larger than the incremented last communication number information to an initial communication number information when a renewed transmitting information is transmitted, and increments the initial communication number information every time the renewed transmitting information is transmitted.

The receiving step comprises an information discrimination step, a communication number information comparison step and a control step. The information discrimination step discriminates whether or not the transmitting information other than the communication number information of the received transmitting information conforms with the registration transmitting information which was registered previously. The communication number information comparison step compares the received communication number information with the communication number information which was registered previously. The control step adds a predetermined value to the received communication number information when the received transmitting information conforms with the registration transmitting information and the received communication number information is larger than the registered communication number information.

The method for controlling information of the present also can be formed even if the processes are as follows. The transmitting information can be composed of a destination information indicating a transmitting identification information and a receiving identification information, a control information for controlling the receiving device and a certifier indicating a justice of the communication number information and the transmission device. Further, the transmission step can be provided with a function step for generating the certifier by inputting the destination information, the control information, the communication number information and the certifying key into the unidirectional function.

The communication number counting step decrements the communication number information every time the identical transmitting information is transmitted, sets the communication number information which is smaller than the decremented last communication number information to an initial communication number information when a renewed transmitting information is transmitted, and decrements the initial communication number information every time the renewed transmitting information is transmitted.

The control step subtracts the predetermined value from the received communication number information when the received transmitting information conforms with the registration transmitting information and the received communication number information is smaller than the registered communication number information.

The communication number counting step may set the communication number information in which 1 was added to a plurality of times of the last communication number information to an initial communication number information when a renewed transmitting information is transmitted and increment the initial communication number information every time the renewed transmitting information is transmitted. The receiving step can be provided with an analysis step for analyzing a received control information when the received destination information conforms with the destination information which was registered previously.

The receiving step comprises a storage step, a function step and a certifier discrimination step. The storage step stores the same certifying key as the certifying key which is inputted into the unidirectional function of the transmission side regarding the transmitting identification information as an address. The function step generates a certifier by inputting the received destination information, the control information, the communication number information and the stored certifying key into the unidirectional function. The certifier discrimination step discriminates whether or not the certifier received from the transmission side conforms with the certifier obtained in the receiving side.

The control step adds the predetermined value to the received communication number information and stores the obtained communication number information, when the certifier generated in the transmission side conforms with the certifier generated in the receiving side. The predetermined value to be added to the received communication number information is the same value as the number of times of transmissions of the identical transmitting information.

The transmission step further transmits the transmitting information repeatedly when the certifier generated in the transmission side does not conform with the certifier generated in the receiving side. The receiving step receives the transmitting information and executes the process repeatedly until the certifiers are conformed with one another.

The method for transmitting information can be provided with a storage step, a function step, a combining step and a communication number counting step. The storage step stores a destination information indicating a transmitting identification information and a receiving identification information, a control information and a communication number information indicating a transmission number. The function step generates a certifier by inputting the stored each information and the certifying key into the unidirectional function. The combining step combines the certifier with the stored each information and transmits the obtained identical transmitting information a plurality of times repeatedly. The communication number counting step increments the communication number information every time the identical transmitting information is transmitted, sets the communication number information which is bigger than the incremented last communication number information to an initial communication number information, when a renewed transmitting information is transmitted and increments the initial communication number information every time the renewed transmitting information is transmitted.

The method for receiving information can be provided with an information discrimination step, a communication number information comparison step and a control step. The information discrimination step discriminates whether or not the transmitting information other than the communication number information indicating a transmission number of the transmitting information received from the transmission side conforms with the registration transmitting information which was registered previously. The communication number information comparison step compares the received communication number information with the communication number information which was registered previously. The control step adds the predetermined value to the received communication number information, when the transmitting information conforms with the registration transmitting information and the received communication number information is bigger than the registered communication number information.

According to the present invention, the communication number counting unit increments the communication number information and transmits the communication number information which was incremented in order and the transmitting information repeatedly, when the transmitting information is transmitted by the transmission device. Further, the communication number counting unit sets the transmitting information which is larger than the incremented last communication number information to an initial communication number information when a renewed transmitting information is transmitted, and increments the initial communication number information every time the renewed transmitting information is transmitted.

On the other hand, in the receiving device, the information discrimination unit discriminates whether or not the transmitting information other than the communication number information of the received transmitting informations conforms with the registration transmitting information which was registered previously. The communication number information comparison unit compares the received communication number information with the communication number information which was registered previously.

Then, the control unit adds the predetermined value to the received communication number information, when the received transmitting information conforms with the registration transmitting information and the received communication number information is larger than the registered communication number information.

The communication number information retransmitted from the third person is smaller than the incremented communication number information when the third person wiretaps the past transmitting information and executes the replay-attack later. The receiving device judges that the replay-attack has been executed by the improper third person, since the communication number information retransmitted from the third person becomes smaller than the registered communication number information.

Accordingly, the communication information can be protected from the replay-attack of the improper third person. The comparison between a transmission code and a receiving code can be executed in a matter of minutes. Further, it sometimes happens that one of the transmission devices is stolen, when a plurality of users control one receiving device by using a plurality of transmission devices. Even in this case, the receiving device can be protected from the misuse only by eliminating an individual key of the stolen transmission device.

Besides, the propriety of the transmission device can be judged, since the destination information, the control information, the communication number information and the certifier are used as items of transmitting information. Further, the certifier can be generated, if the destination information, the control information, the communication number information and the certifying key are inputted into the unidirectional function circuit. The communication number counting unit decrements the communication number information every time the identical transmitting information is transmitted. The control unit subtracts the predetermined value from the received communication number information when the received transmitting information conforms with the registration transmitting information and the received communication number information is smaller than the registered communication number information. By these actions, the transmitting information can be protected from the replay-attack of the improper third person.

The communication number counting unit sets the communication number information in which 1 was added to a plurality of times of the last communication number information to the initial communication number information when the renewed transmitting information is transmitted and increments the initial communication number information every time the renewed transmitting information is transmitted. Accordingly, the receiving device can easily judge that the information is transmitted from the improper third person even if the smaller communication number information of the past is retransmitted by the improper third person.

The receiving device can execute the process corresponding to the control information since the command analysis unit analyzes the received control information when the received destination information conforms with the destination information which was registered previously.

The certifier discrimination unit determines whether or not the received certifier conforms with the certifier obtained in the unidirectional function circuit within the receiving device. The control unit certifies the transmission device as a proper transmission device, when the received certifier conforms with the certifier generated in the unidirectional function circuit within the receiving device. The stored communication number information becomes larger than the past transmitting information retransmitted from the improper third person, since the control unit adds the predetermined value to the received communication number information and stores the obtained communication number information in the storage unit. As a result, the transmitting information can be protected from the replay-attack of the improper third person.

When the certifier generated in the transmission device does not conform with the certifier generated in the receiving device, the transmission device can further transmit the transmitting information repeatedly, and the receiving device can execute the certification by receiving the transmitting information and executing the process repeatedly until the certifiers are conformed with one another.

BRIEF DESCRIPTION OF THE DRAWINGS

FIG. 9 is a diagram indicating one example of a communication control in the second embodiment of the present invention.

FIG. 10 is a diagram indicating another example of the communication control in the second embodiment of the present invention.

FIG. 11 is a diagram indicating a conventional serial partial matching method.

FIG. 12 is a diagram indicating a conventional total serial matching method.

DETAILED DESCRIPTION OF THE PREFERRED EMBODIMENTS

Figure 1:
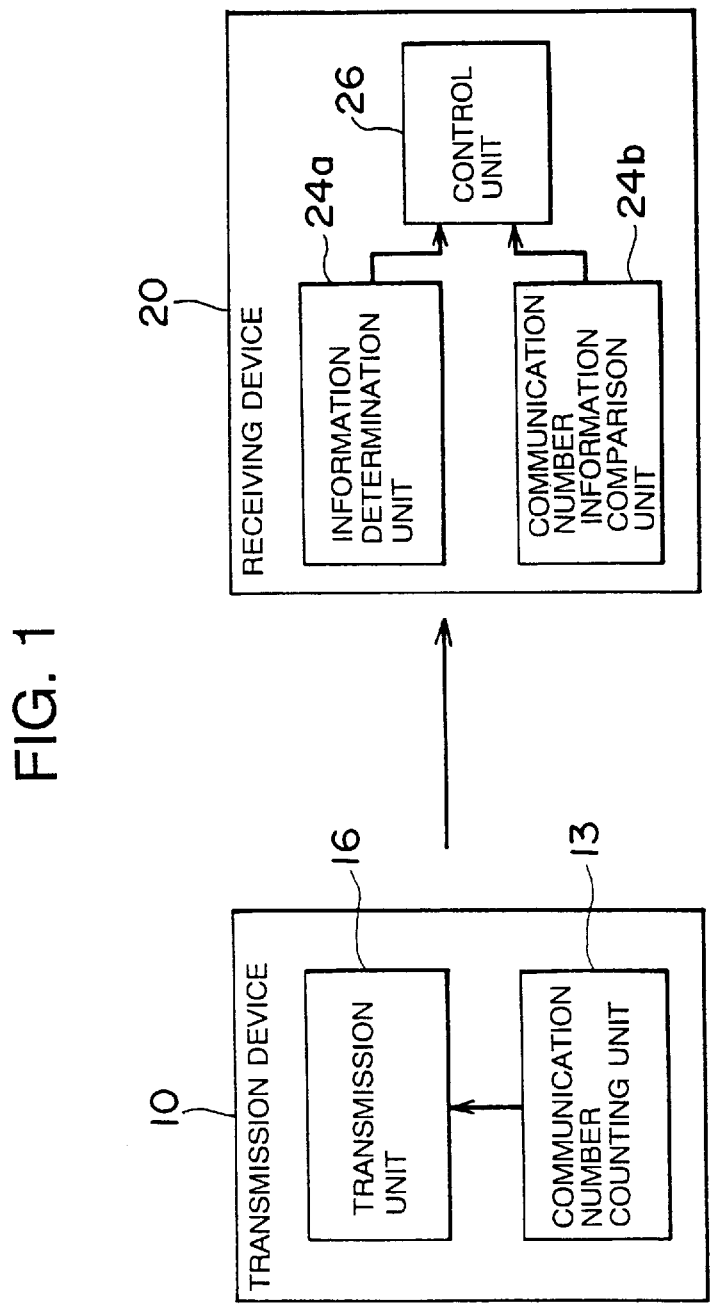
FIG. 1 is a block diagram indicating a device for controlling communication according to first embodiment of the present invention.

Some embodiments of the device and method for controlling communication of the present invention will be described by referring to the drawings.

FIG. 1 is a block diagram indicating a device for controlling communication according to the first embodiment of the present invention. In FIG. 1, the device for controlling communication comprises a transmission device 10 for transmitting a transmitting information and a receiving device 20 for receiving the transmitting information through a line (not shown). The line is a line whose quality is bad. For this reason, the transmission device 10 transmits the identical transmitting information a plurality of times. The receiving device 20 is supposed to receive the transmitting information correctly at least once out of the plurality of times.

The transmission device 10 comprises a transmission unit 16 and a communication number counting unit 13 connected to the transmission unit 16. The transmission unit 16 transmits the identical transmitting information including a communication number information indicating a transmission number a plurality of times repeatedly. The communication number counting unit 13 is, for instance, a counter, and increments the communication number information within the transmission unit every time the identical transmitting information is transmitted.

The communication number counting unit 13 sets the communication number information which is larger than the incremented last communication number information to an initial communication number information when a renewed transmitting information is transmitted, and increments the initial communication number information every time the renewed transmitting information is transmitted.

The receiving device 20 comprises an information discrimination unit 24a, a communication number information comparison unit 24b and a control unit 26 connected to the information discrimination unit 24a and the communication number information comparison unit 24b.

The information determination unit 24a determines whether or not the transmitting information other than the communication number information of the transmitting information received from the transmission device 10 conforms with the registration transmitting information which was registered previously. The communication number information comparison unit 24b compares the received communication number information with the communication number information which was registered previously.

The control unit 26 adds the predetermined value to the received communication number information, when the received transmitting information conforms with the registration transmitting information and the received communication number information is larger than the registered communication number information.

The information discrimination unit 24a, the communication number information comparison unit 24b and the control unit 26 are functions which can be realized, for instance, when a central processing unit executes a program stored in a memory.

Figure 2:
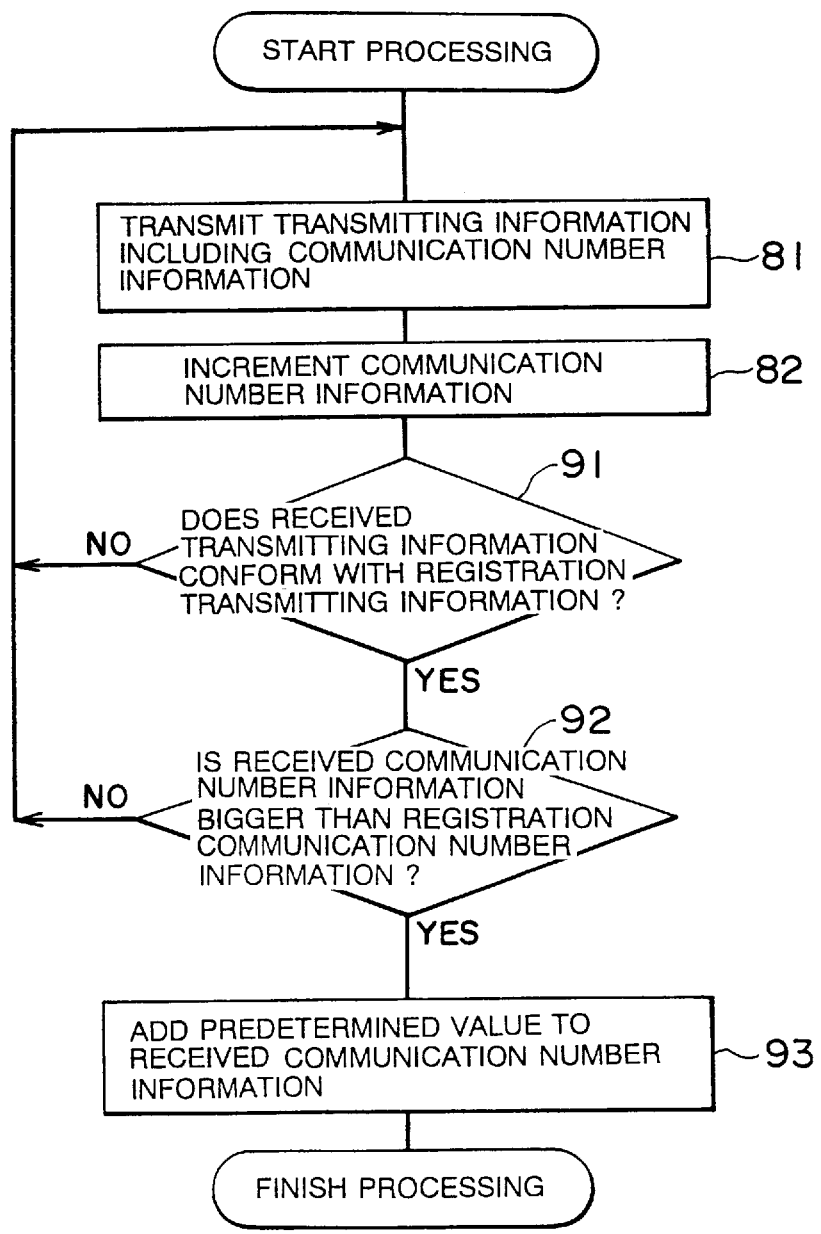
FIG. 2 is a flowchart indicating a method for controlling communication according to the first embodiment of the present invention.

FIG. 2 is a flowchart indicating a method for controlling communication according to the first embodiment of the present invention. The method for controlling communication according to the first embodiment of the present invention will be described by referring to FIG. 1 and FIG. 2.

First of all, in the transmission device 10, the transmission unit 16 transmits the identical transmitting information including a communication number information indicating a transmission number a plurality of times (Step 81).

Then, the communication number counting unit 13 increments the communication number information every time the identical transmitting information is transmitted, sets the communication number information which is bigger than the incremented last communication number information to an initial communication number information when a renewed transmitting information is transmitted, and increments the initial communication number information every time the renewed transmitting information is transmitted (Step 82).

On the other hand, in the receiving device 20, the information discrimination unit 24a determines whether or not the transmitting information other than the communication number information of the received transmitting informations conforms with the registration transmitting information which was registered previously (Step 91). The process returns to Step 81, when the transmitting information other than the communication number information of the received transmitting informations does not conform with the registration transmitting information which was registered previously.

On the other hand, the communication number information comparison unit 24b compares the received communication number information with the communication number information which was registered previously, when the transmitting information other than the communication number information of the received transmitting informations conforms with the registration transmitting information which was registered previously (Step 92). The process returns to Step 81, when the received communication number information is smaller than the communication number information which was registered previously.

On the other hand, the control unit 26 adds the predetermined value to the received communication number information, when the received communication number information is bigger than the registered communication number information (Step 93).

Hereupon, the communication number information retransmitted from the third person is smaller than the incremented communication number information when the third person wiretaps the past transmitting information and executes a replay-attack later. The communication number information retransmitted from the third person becomes smaller than the registered communication number information. For this reason, the receiving device 20 judges that the replay-attack has been executed by the improper third person.

Accordingly, the transmitting information can be protected from the replay-attack of the unjust third person. Besides, the comparison between a transmitting identification information (code) and a receiving identification information (code) can be executed in a matter of minutes. Further, it sometimes happens that one of the transmission devices 10 is stolen when a plurality of users control a receiving device 20 by using a plurality of transmission devices 10. Even in this case, the receiving device 20 can be protected from the misuse only by eliminating an individual key of the stolen transmission device 10.

Figure 3:
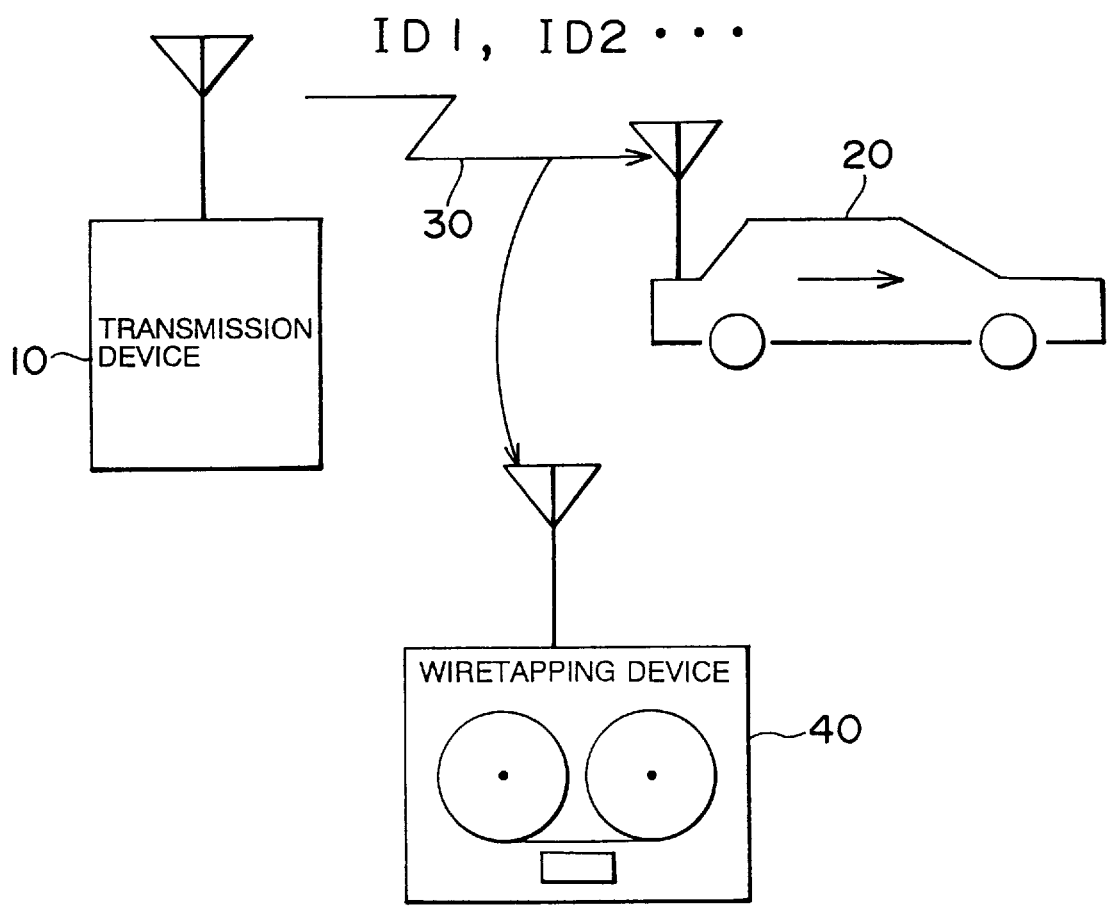
FIG. 3 is a diagram indicating a device for controlling communication according to the second embodiment of the present invention.

Then, the device and method for controlling communication according to the second embodiment of the present invention. FIG. 3 is a diagram indicating the device for controlling communication according to the second embodiment of the present invention. In FIG. 3, the device for controlling communication comprises a transmission device 10 for transmitting a transmitting information, a communication path 30 whose line quality is comparatively bad and a receiving device 20 for receiving the transmitting information through the communication path 30 from the transmission device 10.

The transmitting information comprises a transmitting identification information IDi indicating a destination information, a receiving identification information IDM, a control information X for controlling the receiving device 20, a communication number information k indicating a transmission number (the number of times of transmissions) and a certifier $f_{KY}$ (ID, X, k) indicating a propriety of the receiving device 20.

The transmission device 10 is, for instance, a portable radio transmitter. The receiving device 20 is, for instance, a receiver mounted inside an automobile. Hereupon, the transmission device 10 manipulates, for instance, an engine mechanism and a door-rock mechanism mounted on the automobile remotely.

Only one-way communication from the transmission device 10 to the automobile is executed. Further, when a wiretapping device 40 wiretaps the information transmitted from the transmission device 10, the wiretapping device 40 executes a retransmission-attack against the receiving device 20 later.

Figure 4:
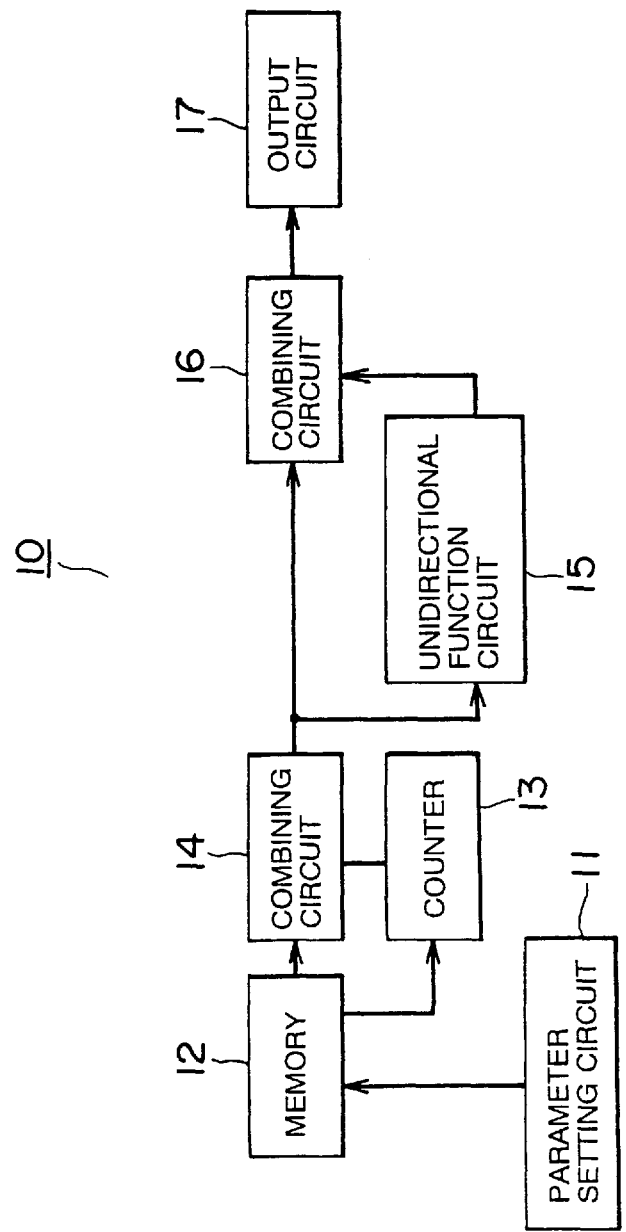
FIG. 4 is a block diagram indicating a transmission device of the second embodiment of the present invention.

FIG. 4 is a block diagram indicating the transmission device of the embodiment 2 of the present invention. The transmission device 10 transmits the identical transmitting information to the receiving device 20 a plurality of times, since the quality of the communication path 30 is bad. The number of times of transmissions of the transmitting information is, for instance, five times. The receiving device 20 is supposed to be able to receive the transmitting information once per five times correctly without fail.

The transmission device 10 comprises a parameter setting circuit 11, a memory 12 connected to the parameter setting circuit 11, a counter 13 connected to the memory 12 and a combining circuit 14 connected to the memory 12 and the counter 13. The transmission device further comprises a unidirectional function circuit 15 connected to the combining circuit 14, a combining circuit 16 connected to the unidirectional function circuit 15 and the combining circuit 14, and an output circuit 17 connected to the combining circuit 16.

The parameter setting circuit 11 sets each information of the transmitting identification information IDi, the receiving identification information IDM, the control (command) information X and the communication number information k as parameters. The memory 12 stores the each information set in the parameter setting circuit 11.

The counter 13 sets an initial value of the communication number information k within the each information stored in the memory 12, and increments the communication number information k by one every time the transmitting information is transmitted.

Namely, only the communication number information k is incremented, and the transmitting information is transmitted five times consecutively. Besides, the counter 13 sets the communication number information which is bigger than the incremented last communication number information to an initial communication number information when a renewed control information X is transmitted, and increments the initial communication number information every time the renewed transmitting information is transmitted.

When the first transmitting information is transmitted n times repeatedly, for instance, the counter 13 sets the initial communication number information k like the following formula at the time that the Lth transmitting information is transmitted, and increments the initial communication number information every time the Lth transmitting information is transmitted.

$k=L \times n+1$

The combining circuit 14 obtains a combining information by combining each information stored in the memory 12.

The unidirectional function circuit 15 converts the combining information combined by the combining circuit 14 into a certifier S with a unidirectional function f and a certifying key KY. The certifier S is expressed by the following formula.

$S=f_{KY}$ (ID, X, k)

The combining circuit 16 obtains a transmitting information by combining the certifier S converted by the unidirectional function circuit 15 with the combining information combined by the combining circuit 14. The output circuit 17 transmits the transmitting information obtained in the combining circuit 16 to the communication path.

Figure 5:
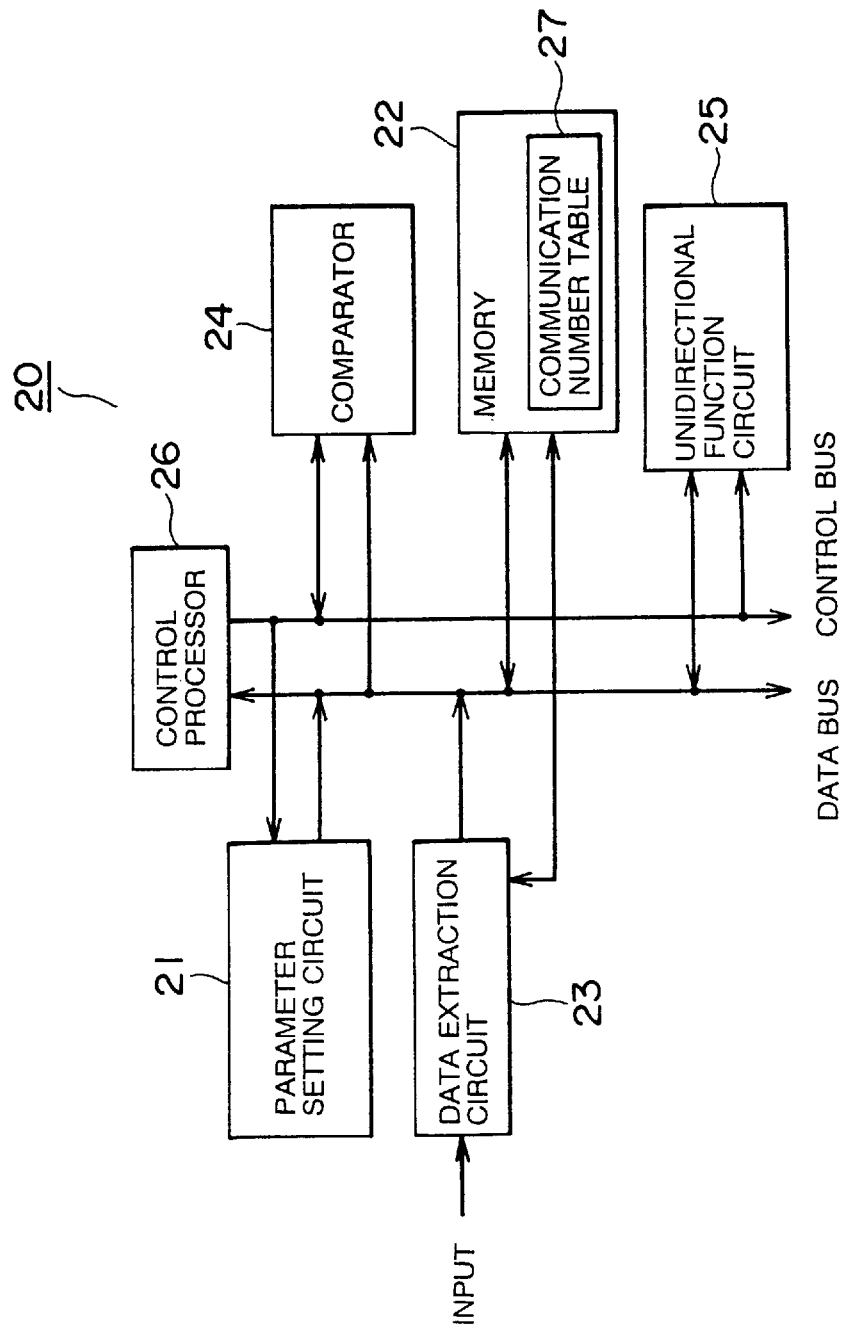
FIG. 5 is a block diagram indicating a receiving device of the second embodiment of the present invention.

FIG. 5 is a block diagram indicating the second receiving device of the embodiment of the present invention. The receiving device 20 judges the destination information, the control information X, the communication number information k and the certifier received from the transmission device 10 and so on. The receiving device 20 adds an addition communication number information Δk (for instance, 5) to the communication number information k, when all of the received informations are correct.

The receiving device 20 is provided with a control processor 26 to which a data bus 31 and a control bus 32 are connected. A parameter setting circuit 21 and a comparator 24 and a unidirectional function circuit 25 are connected to the data bus 31 and the control bus 32. A memory 22 and a data extraction circuit 23 are connected to the data bus 31.

The parameter setting circuit 21 sets such parameters as a transmitting identification information IDi, a receiving identification information IDM, a communication number information k and a certifying key KY, and stores the parameters in the memory 22. The parameter set by the parameter setting circuit 21 is the same value as the parameter set by the parameter setting circuit 11.

The data extraction circuit 23 extracts each information within the received transmitting informations, outputs the extracted control information X to the control processor 26 and outputs each information other than the control information to the comparator 24.

The memory 22 stores the receiving identification information IDM set by the parameter setting circuit 21, and has a communication number table 27. The communication number table 27 stores the communication number information k and the certifying key KY regarding the transmitting identification information IDi as an address.

The comparator 24 determines whether or not the receiving identification information extracted in the data extraction circuit 23 conforms with the receiving identification information which was stored previously in the memory 22. The comparator 24 determines whether or not the transmitting identification information extracted in the data extraction circuit 23 conforms with the transmitting identification information which was stored previously in the memory 22.

The comparator 24 determines whether or not the value of the communication number information k extracted in the data extraction circuit 23 is larger than the value of the communication number information stored in the communication number table 27. The comparator 24 outputs the certifying key KY stored in the communication number table 27 to the unidirectional function circuit 25, when the extracted communication number information is larger than the communication number information stored in the communication number table 27.

The unidirectional function circuit 25 inputs the certifying key KY stored in the communication number table 27, the transmitting identification information IDi, the control information X and the communication number information k to obtain a certifier S by the unidirectional function.

The comparator 24 determines whether or not the certifier S extracted by the data extraction circuit 23 conforms with the certifier obtained in the unidirectional function circuit 25.

The control processor 26 takes in the control information X and analyzes the control information X, when the transmitting identification information IDi extracted by the data extraction circuit 23 conforms with the registration transmitting identification information stored in the memory 27.

The control processor 26 adds the addition communication number information (offset) Δk to the received communication number information k and rewrites the addition result into a communication number information k0 stored in the communication number table 27 as an initial value, when the certifier S extracted by the data extraction circuit 23 conforms with the certifier obtained in the unidirectional function circuit 25.

Figure 6:
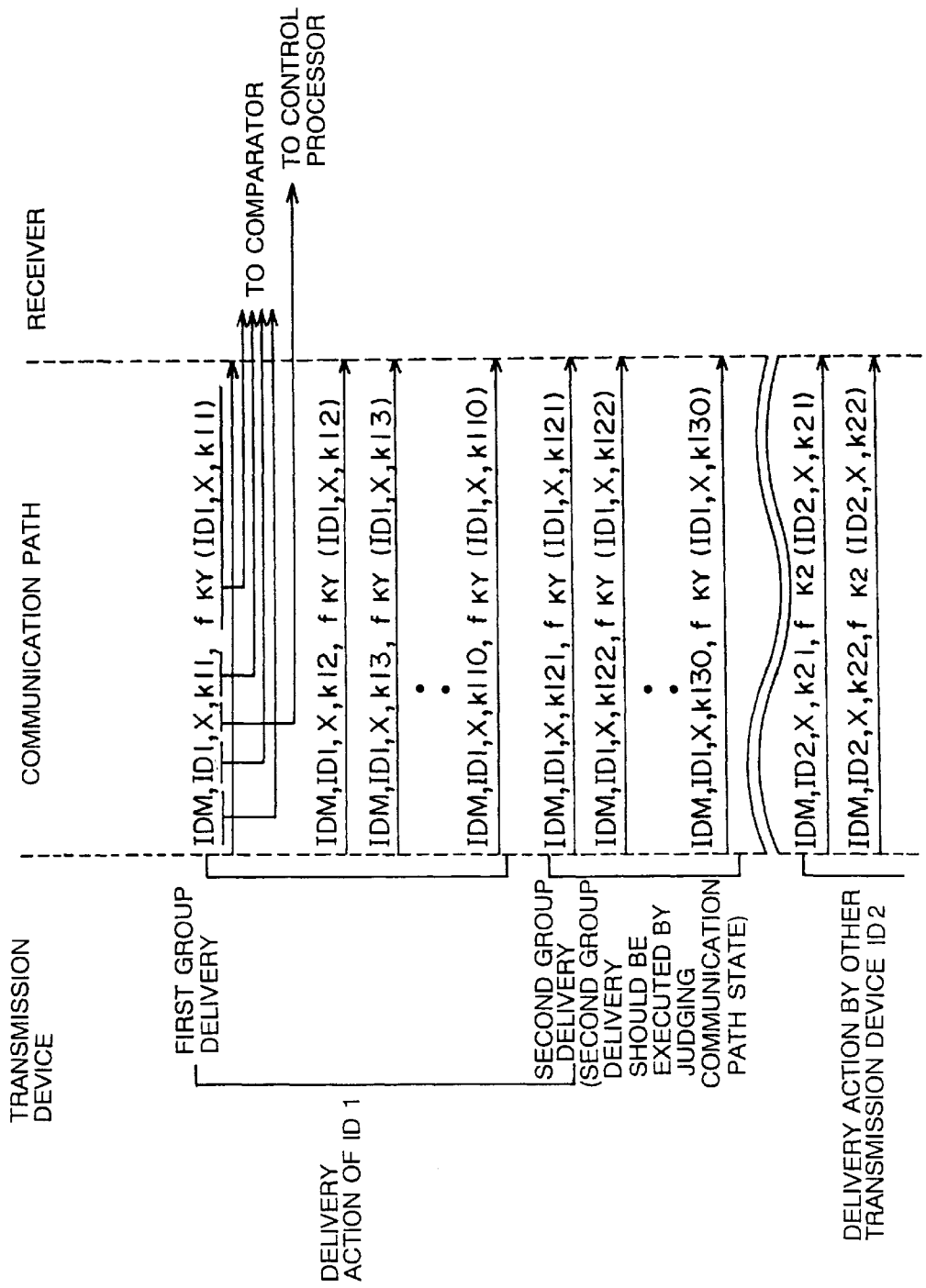
FIG. 6 is a diagram indicating a method for controlling communication in the second embodiment of the present invention.
Figure 7:
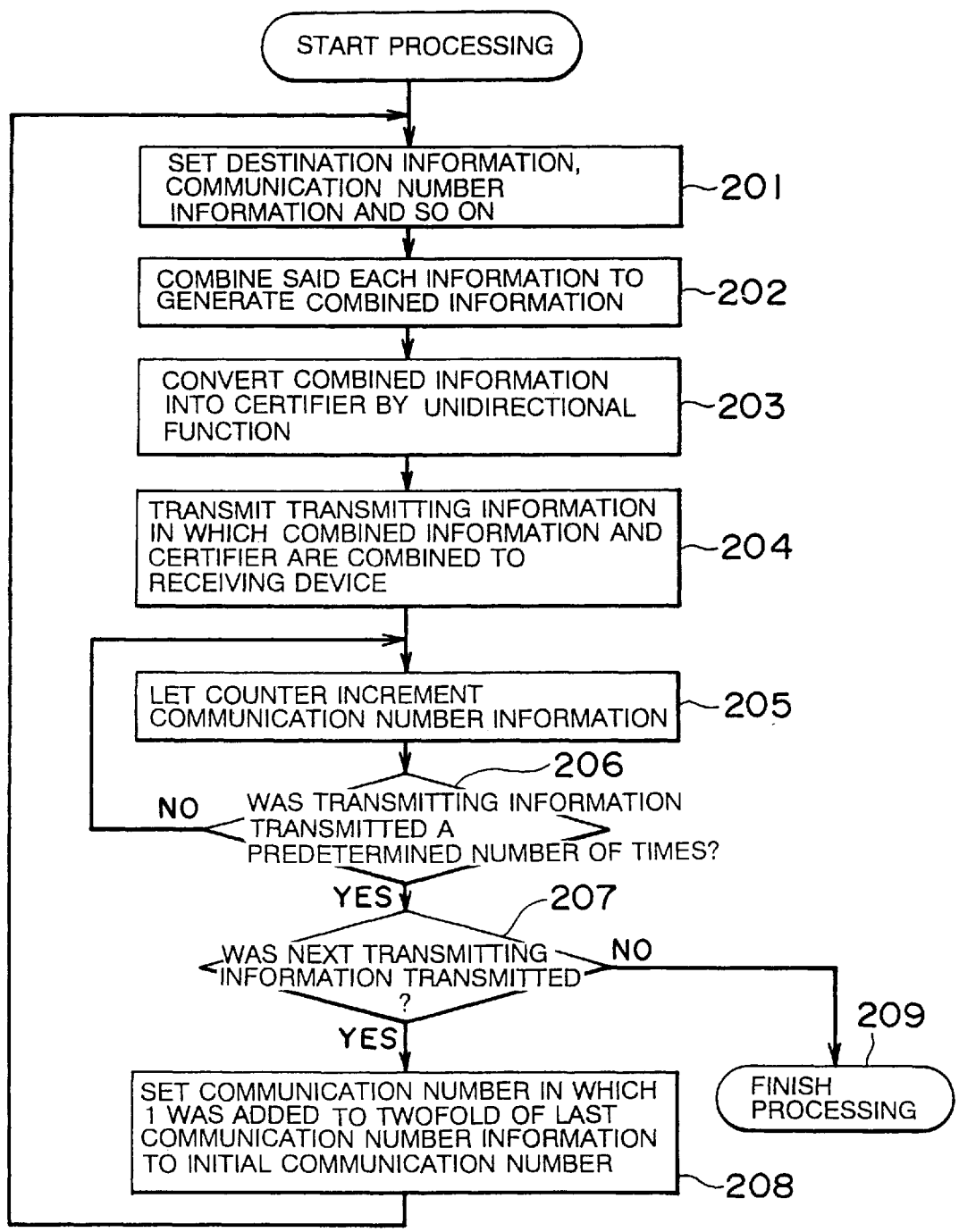
FIG. 7 is a flowchart indicating a process of the transmission device of the second embodiment of the present invention.

Then, the device and method for controlling communication according to the second embodiment of the present invention constructed in the above-mentioned way will be described by referring to the drawings. FIG. 6 is a diagram indicating the method for controlling communication of the second embodiment 2. FIG. 7 is a flowchart indicating a process of the device for controlling communication. Then, the operation of the transmission device will be described.

First of all, in the transmission device 10, the parameter setting circuit 11 sets the transmitting identification information IDi, the receiving identification information IDM, the control information X, the communication number information K and the certifier $f_{KY}$ (ID, X, k), and stores these informations in the memory 12 (Step 201).

The combining circuit 14 reads out the receiving identification information IDM, the transmitting identification information IDi, the control information (command information) X and the communication number information k from the memory 12 and combines these informations (Step 202).

Then, the unidirectional function circuit 15 converts the combining information combined by the combining circuit 14 into the certifier S with the unidirectional function f and the certifying key KY (Step 203).

The combining circuit 16 obtains a transmitting information by combining the certifier S converted by the unidirectional function circuit 15 with the combining information combined by the combining circuit 14. The output circuit 17 transmits the transmitting information obtained in the combining circuit 16 through the communication path to the receiving device 20 (Step 204).

By these operations, for instance, as shown in FIG. 6, the receiving identification information IDM, the transmitting identification information ID1, the control information X, the communication number information k11 and the certifier $f_{KY}$ (ID1, X, k11) of the first group are transmitted to the receiving device 20. Hereupon, the value of the communication number information k11 is, for instance, "1".

Secondly, the counter 13 increments the communication number information k (Step 205). For instance, the value of the communication number information k12 will be "2" and the value of the communication number information k13 will be "3". Then, the transmission device 10 transmits the transmitting information in each communication number information k to the receiving device 20.

Further, the transmission device 10 determines whether or not the transmitting information of the predetermined number of times (predetermined communication number) were transmitted (Step 206). For instance, in the first group, the identical transmitting information is transmitted to the communication number information k 110.

Then, the transmission device 10 determines whether or not the transmitting information of the nth group should be transmitted (Step 207). Hereupon, the n is equal to or more than 2. The counter 13 changes the communication number information in which 1 was added to the twofold of the last communication number information k which was transmitted the last time into an initial communication number information, when the transmitting information of the nth group is transmitted (Step 208).

After that, the process returns to Step 201, and the transmitting information is transmitted a plurality of times repeatedly as the communication number information k is incremented in the nth group.

For instance, the value of the initial communication number information k 121 of the second group is the value in which 1 was added to the twofold of the value of the last communication number information k 110 of the first group. Further, the value of the communication number information k 122, k 123 . . . is the value in which the value of the communication number information k 121 was incremented.

Further, for instance, the transmitting identification information will be ID 2 if the transmitting information is transmitted by other transmission device.

On the other hand, the process is finished when the transmitting information of the nth group is not transmitted in Step 207 (Step 209). Further, the n is equal to or more than 2.

By these operations, the communication number information k is incremented and the identical transmitting information is transmitted to the receiving device 20 a plurality of times repeatedly.

Figure 8:
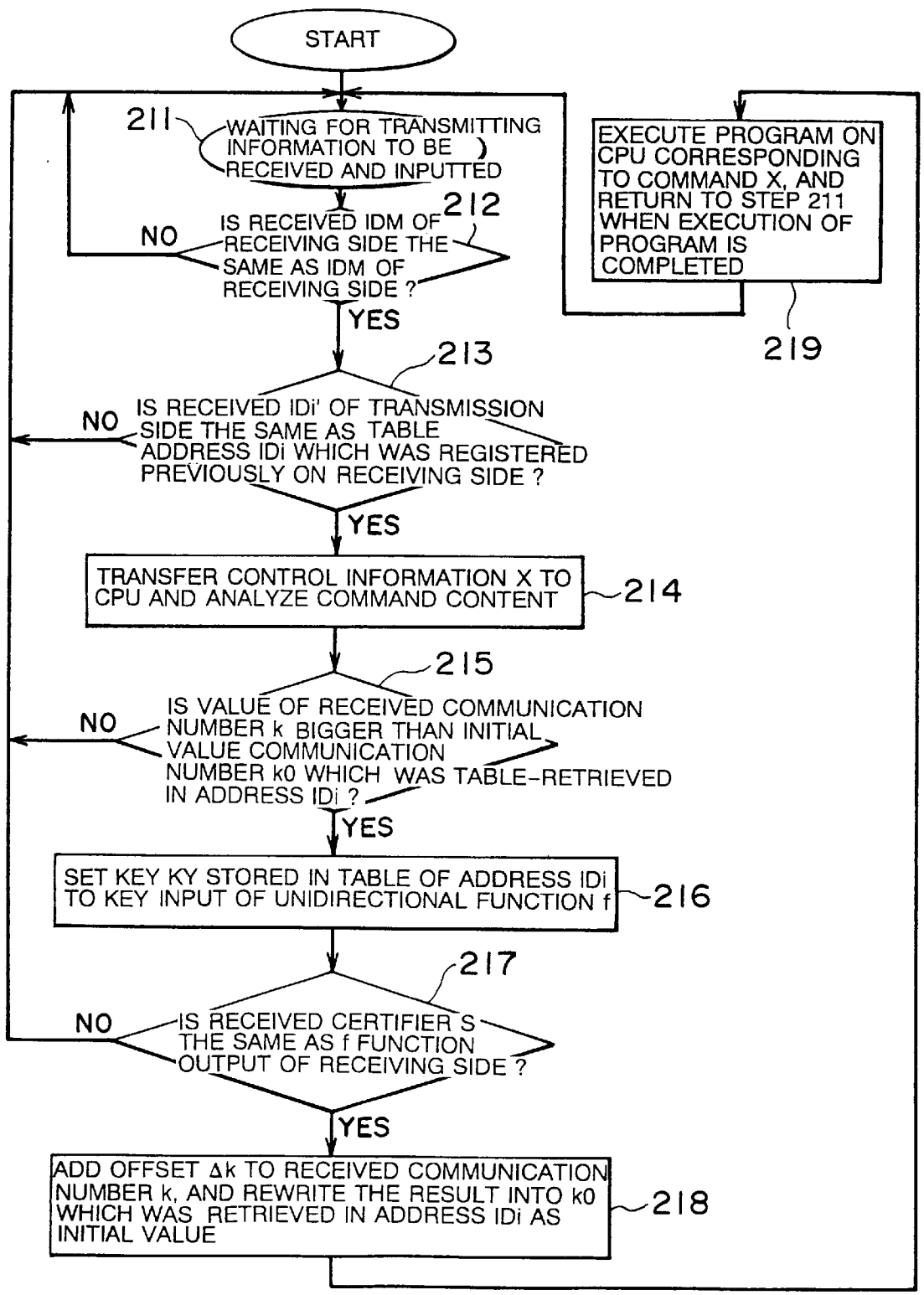
FIG. 8 is a flowchart indicating a process of the receiving device of the second embodiment of the present invention.

Then, the process of the receiving device will be described. FIG. 8 is a flowchart indicating the process of the receiving device.

First of all, the receiving device 20 waits for the transmitting information to be received and inputted from the transmission device 10 (Step 211). Secondly, the data extraction circuit 23 extracts the receiving identification information IDM' out of the transmitting information received from the transmission device 10. Then, the comparator 24 determines whether or not the received receiving identification information IDM' is the same as the receiving identification information IDM stored in the memory 22 (Step 212).

Hereupon, the receiving device 20 determines that the information is not transmitted from the proper transmission device 10, when the received receiving identification information IDM' does not conform with the receiving identification information IDM stored in the memory 22. In this case, the process returns to Step 211.

On the other hand, the comparator 24 determines whether or not the received transmitting identification information IDi' is the same as the transmitting identification information (table address IDi) stored in memory 22 (Step 213), when the received receiving identification information IDM' conforms with the receiving identification information stored in the memory 22.

Hereupon, the receiving device 20 determines that the information is not transmitted from the proper transmission device 10, when the received transmitting identification information IDi' does not conform with the transmitting identification information (table address IDi) stored in memory 22. In this case, the process returns to Step 211.

On the other hand, the received control information X is transferred to the control processor 26, when the received transmitting identification information IDi' conforms with the transmitting identification information (table address IDi) stored in the memory 22. Then, the command content of the control information X is analyzed by the control processor 26 (Step 214).

Further, the comparator 24 determines whether or not the value of the received communication number information k is larger than the initial communication number information k0 which was retrieved from the communication number table 27 by the address IDi (Step 215).

Hereupon, the receiving device 20 determines that the information is not transmitted from the proper transmission device 10, when the value of the received communication number information k is smaller than the initial communication number information k0. In this case, the process returns to Step 211.

On the other hand, the comparator 24 sets the certifying key KY which was stored in the communication number table 27 by the address IDi to the key input of the unidirectional function f of the unidirectional function circuit 25, when the value of the received communication number information k is larger than the initial communication number information k0 (Step 216).

The unidirectional function circuit 25 inputs the certifying key KY, the transmitting identification information IDi, the control information X and the communication number k stored in the communication number table 27 to obtain the certifier S by the unidirectional function f. Further, the comparator 24 determines whether or not the received certifier S conforms with the certifier obtained in the unidirectional function circuit 25 (Step 217).

On the other hand, the receiving device 20 certifies the transmission device 10 as a just transmission device, when the received certifier S conforms with the certifier obtained in the unidirectional function circuit 25. Then, the control processor 26 adds the offset $\Delta k$ to the received communication number information k, and rewrites the addition result into the communication number information k0 of the communication table 27 as an initial value (Step 218).

Hereupon, the offset $\Delta k$ is, for instance, the same value as the number of times of transmissions in which the identical transmitting information is transmitted repeatedly. The offset $\Delta k$ will be 5, if the number of times of transmissions is five.

Further, the process will be executed in order beginning with Step 211, if the received certifier S does not conform with the certifier obtained in the unidirectional function circuit 25 in Step 217. In this case, for instance, if it is assumed that the communication number information k1x is larger than the initial communication number in Step 215 and the received certifier S conforms with the certifier of the receiving side in Step 217, the control processor 26 will add $\Delta k$ to the communication number information K1x, and will write the addition result into the communication number table 27.

Further, the control processor 26 executes a program corresponding to the control information X, and the process returns to the process of Step 211 when the execution of the program is completed (Step 219).

As mentioned hereinbefore, the transmission device 10 transmits the identical transmitting information repeatedly in order incrementing the communication number information, when the transmission device 10 transmits the transmitting information including the transmitting identification information, the receiving identification information, the control information, the communication number information and the certifier.

Further, the transmission device 10 sets the communication number information in which 1 was added to the twofold of the last communication number information which was transmitted the last time as an initial communication number information, when the next control information X is transmitted. Besides, the transmission device 10 increments the initial communication number information in the same way as the first time, and repeatedly transmits the identical transmitting information in order.

On the other hand, the receiving device 20 determines the destination information and analyzes the control information X. Then, the receiving device 20 will compare the sizes of the communication number information k, and will change the content of the communication number table 27 in accordance with the comparison result.

For this reason, the communication number information k retransmitted from the third person is smaller than the incremented communication number information, when the third person wiretaps the transmitting information and executes the replay-attack later. Besides, the receiving device 20 can judge that the replay-attack has been executed by the improper third person, since the communication number information k retransmitted from the third person becomes smaller than the registration communication number information.

Accordingly, the device for controlling communication can protect the communication information from the replay-attack of the improper third person, and can execute the comparison between the transmission code and the receiving code in a matter of minutes.

Besides, it sometimes happens that one of the transmission devices 10 is stolen when a plurality of users control the common receiving device 20 by using a plurality of transmission devices 10. In this case, the receiving device 20 eliminates the individual key of the stolen transmission device 10. For this reason, the receiving device 20 will not be misused.

Then, one example of the communication control is shown in FIG. 9. In the example shown in FIG. 9, the communication number information $\Delta k$ is, for instance, "5".

First of all, the transmission device 10 repeatedly transmits the identical transmitting information including the transmitting identification information ID 1, the receiving identification information IDM, the control information X, the communication number information k and the certifier $f_{KY}$ (ID, X, k), for instance, five times.

Only communication number information k of the transmitting informations of the five times is incremented. For instance, in the first group according to ID 1, the communication number informations k11–k15 are incremented from "1" to "5".

When the transmitting information is transmitted in the communication number information k11(1) and the communication number k12(2), the receiving of both communication number informations k11 and k12 is rejected, since the quality of the line is bad. For this reason, k01 stored in the communication number table is kept "0".

Then, the transmitting information is received correctly, when the transmitting information is transmitted in the communication number information k13(3). At this moment, the value "3" of the communication number information k13 is extracted as a receiving data, and "5" is added to the value "3" of the communication number information k13 as Δk.

As a result, the value "8" of the received communication number information k01 is written into the communication number table 27 which regards ID1 as an address. Further, when the transmitting information is transmitted in the communication number information k14(4) and the communication number information k15(5), the receiving of both communication number informations k14 and k15 is rejected, since the quality of the line is bad. For this reason, the communication number information k01 stored in the communication number table 27 is kept "8".

Hereupon, it is assumed that the improper third person recorded, for instance, the information in the communication number information k15(5) and executed the replay-attack for transmission. Besides, it is assumed that the replay-attack was executed, for instance, in the second transmission (the second group) of the information by the transmitter.

Further, the transmission device 10 increments the communication number information k111 having a value "11" in which 1 was added to the twofold of the value "5" of the last communication number information k15 of the first group as an initial communication number information in the second group. Namely, the communication number informations k111–k115 are changed from "11" to "15".

The value of the communication number information k15 when the improper third person executed the replay-attack is "5". The receiving device 20 compares the value "5" of the received communication number information k15 with the value "8" of the communication number k01 stored in the communication number table 27. In this case, the received communication number information k15 is rejected, since it is smaller than the communication number k01 stored in the communication number table 27.

Namely, the past communication number information will never exceed the value of the communication number information stored in the communication number table 27, even if the information which was transmitted by the transmitter in the past is replayed by the improper third person. For this reason, the improper third person is not certified as a proper person.

As mentioned hereinbefore, the communication information can be protected from the replay-attack of the improper third person, since the communication number information k is incremented.

Moreover, the transmitting information is received correctly, when the transmitting information is transmitted in the communication number information k114(9). At this moment, the value "14" of the communication number information k114 is extracted as a receiving data.

Further, the receiving device 20 compares the value "14" of the received communication number information k114 with the value "8" of the communication number information k01 stored in the communication number table 27. The value "5" of the communication number information Δk is added to the value "14" of the communication number information k114, since the received communication number information k114 is bigger than the communication number information k01 stored in the communication number table 27.

As a result, the value "19" of the communication number information k01 is written into the communication number table 27 which regards ID1 as an address.

Further, in the communication protocol of the second embodiment, generally, the second control information X' is transmitted k times repeatedly regarding the communication number information k shown in the following formula (a) as an initial value, when the transmitter having an IDi transmits the first control information X as a transmitting information n times repeatedly.

$$k = n + \Delta k + 1 \quad (a)$$

Hereupon, Δk is n.

The Lth control information is transmitted k times repeatedly regarding the communication number information k shown in the following formula (b) as an initial value.

$$k = (L-1)n + \Delta k + 1 \quad (b)$$

Then, another example of the communication control is shown in FIG. 10. The communication number information Δk is "0" in the example shown in FIG. 10.

The transmission device 10 repeatedly transmits the transmitting information including the transmitting identification information ID1, the communication number information k and the certifier $f_{KY}$ (ID, X, k) five times. Hereupon, for instance, in the first group according to ID1, the communication number informations k11–k15 are incremented from "1" to "5". When the information is transmitted in the communication number information k11(1) and the communication number information k12(2), the receiving of the both communication number information k11 and the communication number information k12 is rejected, since the quality of the line is poor. In this case, the k01 stored in the communication number table 27 is "0".

Then, the transmitting information is received correctly, when the information is transmitted in the communication number information K13(3). At this moment, the value "3" of the communication number information k13 is extracted as a receiving data. Further, the value "3" of the communication number information k01 is written into the communication number table 27 which regards the ID1 as an address, since the communication number information Δk is "0". In this case, the proper receiving is formed.

Further, when the information is transmitted in the communication number information k14(4) and the communication number information k15(5), the receiving of the both informations is rejected, since the quality of the line is improper. For this reason, the communication number information k01 stored in the communication number table 27 is kept "3".

Hereupon, it is assumed that the improper third person recorded the information in the communication number information k14(4) and executed the replay-attack for transmitting the information for the second time later. Besides, it is assumed that the replay-attack is executed in the second transmission (the second group) of the information by the transmitter.

The communication number information k14 (when the unjust third person executed the replay-attack) is "4". The receiving device 20 compares the value "4" of the received communication number information k14 with the value "3" of the communication number information k01 stored in the communication number table 27.

In this case, the receiving information is received, since the received communication number information k14 is larger than the communication number information k01 stored in the communication number table 27. Namely, the disguise of the improper third person is formed. For this reason, the communication number k01=4 is written into the communication number table 27 in which the ID1 is regarded as an address.

As mentioned hereinbefore, the communication information cannot be protected from the replay-attack by the improper third person, when the communication number information k is not incremented.

For this reason, there are some cases where the automobile will be stolen by the improper third person, even if a time information in which the communication number information k was merely counted up is transmitted when the engine and the door-lock mechanism of the automobile is remotely controlled. In this case, the receiving device 20 will be dominated by improper third person, if the just user continues transmitting the remote control information in accordance with the protocol.

Further, the present invention is not limited to the second embodiment. In the second embodiment, the counter 13 installed on the transmission device 10 increments the communication number information every time the identical transmitting information is transmitted. The counter 13 sets the communication number information which is larger than the incremented last communication number information to an initial communication number information when a renewed transmitting information is transmitted, and increments the initial communication number information every time the renewed transmitting information is transmitted.

Besides, the control processor 26 installed on the receiving device 20 adds a predetermined value to the received communication number information, when the received transmitting information conforms with the registration transmitting information and the received communication number information is larger than the registered communication number information.

For instance, the counter 13 may decrement the communication number information every time the identical transmitting information is transmitted. The counter 13 may set the communication number information which is smaller than the decremented last communication number information to the initial communication number information when the renewed transmitting information is transmitted, and decrement the initial communication number information every time the renewed transmitting information is transmitted.

The control processor 26 may add the predetermined value to the received communication number information when the received transmitting information conforms with the registration transmitting information and the received communication number information is smaller than the registered communication number information.

The same effect as the second embodiment can be obtained, even if the above-mentioned counter and the control processor are employed.

What is claimed is:

1. A device for controlling communication, comprising:

a transmission device having transmission means for transmitting identical information with a communication number indicating a transmission number thereof a plurality of times repeatedly, and communication number counting means for incrementing the communication number every time the identical information is transmitted, and setting a communication number which is greater than the last incremented communication number as an initial communication number at the time of transmission of renewed information; and a receiving device having connected with the transmission device through transmission lines, said receiving device capable of receiving the information out of a plurality of pieces of the identical information repeatedly transmitted from the transmission device, said receiving device having information determination means for determining whether or not information received from the transmission device conforms with registration information which was registered previously, communication number comparison means for determining whether or not the communication number attached to the received information is greater than a registered communication number which was registered previously, and control means for adding a predetermined value to the registered communication number when the received information is determined by the information determination means as conforming with the registered information and the communication number attached to the received information is determined by the communication number comparison means to be greater than the registered communication number, such that the added-to registered communication number becomes greater than said last incremented communication number and less than said initial communication number.

2. A device for controlling communication according to claim 1, wherein the information being transmitted comprises destination information indicating transmitting identification information and receiving identification information, control information for controlling the receiving device and a certifier indicating a propriety of the transmission device.

3. A device for controlling communication according to claim 2, wherein the transmission device further includes a unidirectional function means for generating the certifier by inputting the destination information, the control information, the communication number information and a certifying key into a unidirectional function.

4. A device for controlling communication according to claim 3, wherein the receiving device comprises:

storage means for storing the same certifying key as the certifying key which is inputted into the unidirectional function means within the transmission device regarding the transmitting identification information as an address;

unidirectional function means for generating a certifier by inputting the destination information, the control information and the communication number received from the transmission device, and the certifying key stored in said storage means into the unidirectional function means; and certifier discrimination means for discriminating whether or not the certifier received from the transmission device conforms with the certifier obtained in said unidirectional function means of the receiving device, wherein said control means adds the predetermined value to the received communication number to produce a communication number and stores the produced communication number in said storage means when the certifier generated in said unidirectional function means within the transmission device conforms with the certifier generated in said unidirectional function means within the receiving device.

5. A device for controlling communication according to claim 4,
wherein the transmission device further transmits the information repeatedly when the certifier generated in said unidirectional function means within the transmission device does not conform with the certifier generated in said unidirectional function means within the receiving device, and
wherein the receiving device receives the information and processes the information repeatedly until the certifiers are conformed with one another.

6. A device for controlling communication according to claim 2, wherein the receiving device comprises command analysis means for analyzing the control information when the destination information conforms with destination information which was registered previously.

7. A device for controlling communication according to claim 1, wherein said communication number counting means decrements the communication number every time the identical information is transmitted, and sets a communication number which is less than the last decremented communication number as an initial communication number at the time of transmission of renewed information,
wherein said communication number comparison means determines whether or not the communication number attached to the received information is less than the registered communication number, and
said control means subtracts the predetermined value from the received communication number when the received information is determined by the information determination means as conforming with the registration information and the communication number attached to the received information is determined by the communication number comparison means to be less than the registered communication number, so that the subtracted-from registered communication number becomes less than said last decremented communication number and greater than said initial communication number.

8. A device for controlling communication according to claim 1, wherein said communication number counting means sets the communication number in which one (1) was added to the last communication number a plurality of times as the initial communication number at the time of transmission of the renewed information.

9. A device for controlling communication according to claim 1, wherein the predetermined value to be added to the received communication number is the same value as the number of transmissions of the identical information.

10. A transmission device connected with a receiving device through transmission lines allowing the receiving device to receive information once out of plurality of transmissions from the transmission device, comprising:
storage means for storing destination information indicating transmitting identification information and receiving identification information, control information for controlling the receiving device and a communication number indicating a transmission number;
unidirectional function means for generating a certifier by inputting each information stored in said storage means and a certifying key into a unidirectional function;
combining means for generating information by combining the certifier with the destination information and control information and attaching a communication number stored in said storage means and for transmitting generated information with the communication number a plurality of times repeatedly; and
communication number counting means for incrementing the communication number attached information which is generated by said combining means every time the identical information is transmitted, and setting a communication number which is greater than the last incremented communication number as an initial communication number and greater than the registered communication number which is held by the receiving device at the time of transmission of renewed information.

11. A receiving device connected with a transmission device having transmission means for transmitting identical information with a communication number indicating a transmission number a plurality of times repeatedly, and communication number counting means for incrementing the communication number every time the identical information is transmitted, and setting a communication number which is greater than the last incremented communication number as an initial communication number at the time of transmission of renewed information, by means of transmission lines allowing the receiving device to receive the information once out of the plurality of times of transmissions from the transmission device, the receiving device comprising:
information determination means for determining whether or not information received from the transmission device conforms with registered information which was registered previously;
communication number information comparison means for determining whether or not the received communication number attached to the received information is greater than a registered communication number which was registered previously; and
control means for adding a predetermined value to the registered communication number, when the received information is determined by the information determination means as conforming with the registered information and the communication number attached to the received information is determined by the communication number comparison means as greater than the registered communication number, so that the added-to registered communication number becomes greater than said last incremented communication number and less than said initial communication number.

12. A method for controlling communication, comprising:
a transmission step having an information transmitting step for repeatedly transmitting identical information with a communication number indicating a transmission number thereof a plurality of times, and a communication number counting step for incrementing the communication number every time the identical information is transmitted and setting a communication number which is greater than the last incremented communication number as an initial communication number at the time of transmission of renewed information; and
a receiving step for receiving the information out of a plurality of pieces of the identical information repeatedly transmitted in the transmission step, said receiving step comprising an information determination step for determining whether or not information received from a transmission device conforms with registration information which was registered previously; a communication number comparison step for determining whether or not the communication number attached to the received information is greater than a registered communication number which was registered previously; and a control step for adding a predetermined value to the registered communication number when the received information is determined in the information determination step as conforming with the registrated information and the communication number attached to the received information is determined in the communication number comparison step to be greater than the registered communication number, such that the added-to registered communication number becomes greater than said last incremented communication number and less than said initial communication number.

13. A method for controlling communication according to claim 12, wherein the information being transmitted comprises destination information indicating transmitting identification information and receiving identification information, control information for controlling the receiving step and a certifier indicating a propriety of the transmission step.

14. A method for controlling communication according to claim 13, wherein the transmission step further includes a unidirectional function step for generating the certifier by inputting the destination information, the control information, the communication number and a certifying key into a unidirectional function.

15. A step for controlling communication according to claim 14, wherein the receiving step comprises:

storage step for storing the same certifying key as the certifying key which is inputted into the unidirectional function of a transmission side regarding the transmitting identification information as an address;

unidirectional function step for generating a certifier by inputting the destination information, the control information and the communication number received from the transmission device, and the certifying key stored in said storage step into the unidirectional function; and certifier discrimination step for discriminating whether or not the certifier received from the transmission device conforms with the certifier obtained in a receiving device, wherein said control step adds the predetermined value to the received communication number to produce a communication number and stores the produced communication number when the certifier generated in the transmission side conforms with the certifier generated in receiving side.

16. A method for controlling communication according to claim 15, wherein the transmission step further transmits the information repeatedly when the certifier generated in the transmission device does not conform with the certifier generated in the receiving device, and wherein the receiving device receives the information and processes the information repeatedly until the certifiers are conformed with each other.

17. A method for controlling communication according to claim 13, wherein the receiving step comprises a command analysis step for analyzing the control information when the destination information conforms with the destination information which was registered previously.

18. A method for controlling communication according to claim 12, wherein said communication number counting step decrements the communication number every time the identical information is transmitted, and sets a communication number which is less than the last decremented communication number as an initial communication number at the time of transmission of renewed information, wherein said communication number comparison step determines whether or not the communication number attached to the received information is less than the registered communication number, and wherein said control step subtracts the predetermined value from the received communication number when the received information is determined in the information determination step as conforming with the registration information and the communication number attached to the received information is determined in the communication number comparison step as less than the registered communication number, so that the subtracted-from registered communication number becomes less than said last decremented communication number and greater than said initial communication number.

19. A method for controlling communication according to claim 12, wherein said communication number counting step sets the communication number in which one (1) was added to the last communication number a plurality of times as the initial communication number at the time of transmission of the renewed information.

20. A method for controlling communication according to claim 12, wherein the predetermined value to be added to the received communication number is the same value as the number of transmissions of the identical information.

21. A transmission method including a transmission device connected with a receiving device through lines allowing the receiving device to receive information once out of plurality of times of transmissions from the transmission device, the method comprising:

a storage step for storing a destination information indicating transmitting identification information and receiving identification information, control information for controlling the receiving device and a communication number indicating a transmission number;

a unidirectional function step for generating a certifier by inputting each information stored in said storage step and a certifying key into a unidirectional function;

a combining step for generating information by combining the certifier with the destination information and control information and attaching a communication number stored in said storage step and for transmitting generated information with the communication number a plurality of times repeatedly; and a communication number counting step for incrementing the communication number attached information which is generated in said combining step every time the identical information is transmitted, and setting the communication number which is greater than the last incremented communication number as an initial communication number and greater than the registered communication number which is held by the receiving device at the time of transmission of renewed information.

22. A receiving method including a receiving device connected with a transmission device for repeatedly transmitting identical information with a communication number indicating a transmission number a plurality of times, and incrementing the communication number every time the identical information is transmitted, and setting a communication number which is greater than the last incremented communication number as an initial communication number at the time of transmission of renewed information, by means of transmission lines allowing the receiving device to receive the information once out of the plurality of transmissions from the transmission device, the receiving method comprising;

an information determination step for determining whether or not information received from the transmission device conforms with registered information which was registered previously;

a communication number information comparison step for determining whether or not the received communication number attached to the received information is greater than a registered communication number which was registered previously; and a control step for adding a predetermined value to the registered communication number, when the received information is determined in the information determination step as conforming with the registered information and the communication number attached to the received information is determined in the communication number comparison step as greater than the registered communication number, so that the added-to registered communication number becomes greater than said last incremented communication number and less than said initial communication number.

\* \* \* \* \*

UNITED STATES PATENT AND TRADEMARK OFFICE
CERTIFICATE OF CORRECTION

PATENT NO.: 5,832,210
DATED : November 3, 1998
INVENTOR(S): AKIYAMA et al.

It is certified that an error appears in the above-identified patent and that said Letters Patent is hereby corrected as shown below:

Item [73] the Assignee, "Kawasaki-ku, Japan" should be --Kawasaki-shi, Japan--.

Signed and Sealed this

Twenty-ninth Day of February, 2000

Attest:

Q. TODD DICKINSON

Attesting Officer

Commissioner of Patents and Trademarks